(12) United States Patent
Burkhardt et al.

(10) Patent No.: US 12,448,255 B2
(45) Date of Patent: Oct. 21, 2025

(54) CRANE

(71) Applicant: Liebherr-Werk Biberach GmbH, Biberach an der Riss (DE)

(72) Inventors: Mark Burkhardt, Stuttgart (DE); Lena Joachim, Stuttgart (DE); Otto Lerke, Stuttgart (DE); Matthias Thomas, Stuttgart (DE); Volker Schwieger, Leutenbach (DE); Norbert Haala, Schwaikheim (DE); Oliver Sawodny, Stuttgart (DE)

(73) Assignee: Liebherr-Werk Biberach GmbH, Biberach an der Riss (DE)

( * ) Notice: Subject to any disclaimer, the term of this patent is extended or adjusted under 35 U.S.C. 154(b) by 54 days.

(21) Appl. No.: 18/673,461

(22) Filed: May 24, 2024

(65) Prior Publication Data

US 2024/0327173 A1    Oct. 3, 2024

Related U.S. Application Data

(63) Continuation of application No. PCT/EP2022/083114, filed on Nov. 24, 2022.

(30) Foreign Application Priority Data

Nov. 24, 2021    (DE) .......................... 102021130785.6

(51) Int. Cl.
    *B66C 13/46*         (2006.01)
    *B66C 13/48*         (2006.01)
    (Continued)

(52) U.S. Cl.
    CPC .............. *B66C 13/46* (2013.01); *B66C 13/48* (2013.01); *G01S 17/89* (2013.01); *G01S 19/42* (2013.01);
    (Continued)

(58) Field of Classification Search
    CPC ......... B66C 13/46; B66C 13/06; B66C 13/48; B66C 23/88; G01S 17/89; G01S 19/42; G06T 7/70; H04W 4/02
    See application file for complete search history.

(56) References Cited

U.S. PATENT DOCUMENTS 5,526,946 A    6/1996   Overton
9,041,595 B2   5/2015   Cameron et al.
(Continued)

FOREIGN PATENT DOCUMENTS

DE     19725315 C2    3/2001
DE     10324692        1/2005
(Continued)

*Primary Examiner* — Tan Q Nguyen
(74) *Attorney, Agent, or Firm* — Levine Bagade Han LLP

(57) ABSTRACT

The present invention relates to a crane, in particular in the form of a rotating tower crane, having a crane jib, from which a hoist rope connected to a load handling means runs, a load position sensor system for sensing the position of the load handling means and/or of a load fastened thereto, a surroundings sensor system for collecting surroundings data to establish a surroundings model, and a crane controller for controlling hoist rope and/or crane movements on the basis of the sensed position of the load handling means and/or of the load fastened thereto and on the basis of the established surroundings model. According to the invention, the surroundings sensor system has an imaging sensor system for providing three-dimensional real-time surroundings data and a geo-referencing device for geo-referencing the 3D real-time surroundings data and establishing a geo-referenced 3D surroundings model.

22 Claims, 5 Drawing Sheets

(51) Int. Cl.
  *G01S 17/89* (2020.01)
  *G01S 19/42* (2010.01)
  *G06T 7/70* (2017.01)
  *H04W 4/02* (2018.01)
  *H04W 4/021* (2018.01)

(52) U.S. Cl.
  CPC .............. *G06T 7/70* (2017.01); *H04W 4/021* (2013.01); *H04W 4/025* (2013.01); *G06T 2207/10028* (2013.01)

(56) References Cited

U.S. PATENT DOCUMENTS

| | | | |
|---|---|---|---|
| 9,522,809 B2 | 12/2016 | Conquest et al. | |
| 9,547,088 B2 | 1/2017 | Cameron et al. | |
| 2013/0161279 A1 | 6/2013 | Schneider et al. | |
| 2013/0299440 A1* | 11/2013 | Hermann | B66C 15/065 340/8.1 |
| 2013/0345857 A1 | 12/2013 | Lee et al. | |
| 2019/0337771 A1 | 11/2019 | Norton et al. | |
| 2020/0386605 A1 | 12/2020 | Oren et al. | |
| 2023/0401348 A1* | 12/2023 | Mitani | B66C 13/48 |
| 2025/0153979 A1* | 5/2025 | Scholz | G06T 7/593 |

FOREIGN PATENT DOCUMENTS

| | | |
|---|---|---|
| DE | 102006001279 | 7/2007 |
| DE | 202008008174 U1 | 12/2009 |
| DE | 102009032270 | 1/2011 |
| DE | 202008018260 U1 | 7/2012 |
| DE | 102015218686 | 3/2017 |
| DE | 102020104049 | 8/2021 |
| EP | 1628902 | 10/2007 |
| EP | 2562125 | 2/2013 |
| EP | 2931649 | 10/2015 |
| JP | 9-142773 | 6/1997 |
| WO | WO 1991/014644 | 10/1991 |
| WO | WO 2005/082770 | 9/2005 |
| WO | WO 2019/229751 | 12/2019 |
| WO | WO 2020/182592 | 9/2020 |
| WO | WO 2023/094516 | 6/2023 |

* cited by examiner

CRANE

CROSS-REFERENCE TO RELATED APPLICATIONS

This application is a continuation of International Patent Application Number PCT/EP2022/083114 filed Nov. 24, 2022, which claims priority to German Patent Application Number DE 10 2021 130 785.6 filed Nov. 24, 2021, which are incorporated herein by reference in their entireties.

BACKGROUND

The present invention relates to a crane, in particular in the form of a rotating tower crane, having a crane jib from which a hoist rope connected to a load handling means runs, a load position sensor system for sensing the position of the load handling means and/or a load fastened thereto, a surroundings sensor system for collecting surroundings data to establish a surroundings model, and a crane controller for controlling hoist rope movements and/or crane movements on the basis of the sensed position of the load handling means and/or the load fastened thereto, and on the basis of the established surroundings model.

Revolving tower cranes can have an at least approximately horizontal, optionally also upwardly luffable, crane boom that Is supported by a tower that extends upright and that can be rotated about the upright longitudinal tower axis Revolving tower cranes can have an at least approximately horizontal, optionally also upwardly luffable, crane boom that Is supported by a tower that extends upright and that can be rotated about the upright longitudinal tower axis. The distance of the load hook from the tower axis can be set by means of a trolley that is travelable along the boom, with the hoist rope connected to the load hook running off over said trolley or also by luffing up a needle boom.

It is desirable in this process for various reasons to determine the exact position of the load hook as exactly as possible via a corresponding load hook position determination device. This cannot only be advantageous if the load hook is no longer visible to the crane operator, for example behind a wall, but rather also when the trolley position no longer corresponds exactly to the load hook position, i.e. is no longer congruent in the perpendicular direction (it is understood that the vertical position of the load hook and of the trolley differs due to the lowering depth of the load hook). Such a difference of the load hook position from the trolley position can have various reasons, for example a non-straight extent as a result of wind forces or harmonics of the hoist rope or dynamic excursions such as swaying movements of the load or wind deflections.

Depending on the job to be done, it may be sufficient here to determine the load hook position only relative to the trolley or to the crane, for example to damp swaying movements, or an absolute load hook position in space can also be required, for example to implement an automated operation in transfer procedures. Apart from such uses of the load hook position signal for control purposes, increased safety can also be achieved by determining the load hook position since the load can be permanently monitored, with optionally a redundancy of the lowering depth sensor also being able to be achieved.

Such assistance systems of a crane such as sway damping that work by a determination of the load hook position are known, for example, from the documents DE 20 2008 018 260 U1 or DE 10 2009 032 270 A1 or also from the documents EP 16 28 902 B1, DE 10 324 692 A1, EP 25 62 125 B1, US 2013 01 61 279 A, or U.S. Pat. No. 5,526,946 B.

A load sway damping system is furthermore known from the company of Liebherr under the name "Cycoptronic" that calculates load movements and influences such as the wind in advance and initiates compensation movements based thereon, with the rope angle with respect to the vertical and its variations being detected by means of gyroscopes to intervene in the control in dependence on the gyroscope signals.

The load hook position can here generally be detected in different manners, with document WO 91/14644 A1 showing such a load hook position determination, for example.

A more complex position determination and environment monitoring is shown in US 2013/0345857 A1, which aims to sense the position of the load hook by means of a GPS sensor attached to it and also uses a three-dimensional model of the building structure to be erected, which is generated from planning data and updated using a camera attached to the crane. A navigation system establishes a travel path for the load hook based on the GPS position of the load hook and the 3D surroundings model.

Other systems for establishing the load hook position on cranes are shown in U.S. Pat. Nos. 9,041,595 B2, 9,547,088 B2 and 9,522,809 B2, which propose GPS sensors, radar sensors or laser-based distance sensors for this purpose.

A system for establishing the load hook position in real time using several wireless sensors is shown in WO 2020/182592 A1.

From the prior art, it is also known to sense the load hook position optically. For example, the JP 9-142773 shows a crane on the jib tip of which, from which the hoist rope runs, a downward-looking camera is mounted, the viewing direction of which is adjusted to follow pendulum movements of the load hook so that the crane operator can always see the load hook via the camera. The DE 197 25 315 C2 describes a metallurgical plant crane with a trolley chassis that can be moved relative to a support frame, from which the hoist rope runs. Several cameras are arranged on the support frame with a field of view large enough to sense the crane hook in various trolley positions.

Document WO 2005/082770 A1 also discloses a rotating tower crane with a downward looking camera installed on its trolley so as to show the crane operator the video image of the surrounding environment of the load hook, so that the crane operator can better Identify obstacles in the direction of movement well. In order to also be able to better detect the load hook, which can only be seen very small from the crane jib, at great lowering depths, it is proposed in the EP 29 31 649 B1 to provide the observing camera with an automatic zoom.

The document DE 10 2006 001279 A proposes to install a transmitting and receiving device on the trolley of a rotating tower crane. The transmitting and receiving device exchanges signals with the radio module on the load hook and the boom. Time is used to determine the distance between the trolley and the tower, and therefore the abduction and the depth of descent of the load hook. Also, in order to determine the lateral offset of the load hook relative to the trolley, an inclination sensor will be used to measure the deflection angle of the sling, which, together with the depth of descent, corrects the suspension of the load or determines the deflection of the load hook relative to the trolley.

Therefore, the object of the present invention is to provide an improved crane and an improved method and device for controlling the crane, which avoid the disadvantages of the prior art and further develop the latter in an advantageous manner. In particular the reliable and precise determination of the load hook position as well as the structures and objects in the crane surroundings in real time should be achieved, enabling efficient, automatic control of the load hook along a travel path and sway damping.

Summary

According to the invention, said object is achieved by a crane according to claim 1, an apparatus for controlling the same according to claim 21 and an apparatus according to claim 22. Preferred embodiments of the invention are the subject of the dependent claims.

It is therefore proposed to supply the three-dimensional surroundings model in real time to the crane controller, which has an interface for the surroundings sensor system and takes into account both the sensed position of the load handling means or the load fastened thereto and also the real-time surroundings model for controlling the crane movements. According to the invention, the surroundings sensor system has an imaging sensor system for providing three-dimensional real-time surroundings data and a georeferencing device for georeferencing the 3D real-time surroundings data and establishing a geo-referenced 3D surroundings model. The load position sensor system comprises an absolute position sensor system for sensing the absolute position of the load hook and/or the load fastened thereto, wherein the crane controller is configured to control the hoist rope and/or crane movements on the basis of a real-time comparison of the geo-referenced 3D surroundings model with the absolute position of the load hook and/or the load fastened thereto.

On the one hand, the absolute position sensor system can be used to sense the exact position of the load or load hook in the superordinate coordinate system without the accuracy being impaired by influences such as bending of the crane structure, as is the case with conventional sensor systems that sense the relative position of the load hook to the crane structure, for example by measuring the drive positions such as the angle of rotation of the rotating tower crane, the trolley position and the hoist rope length. On the other hand, the georeferencing of the surroundings data or the surroundings model enables a comparison with the absolute position data of the load hook or the load fastened to it, which on the one hand enables collision-free load transport or reduces the risk of collision during automatic load transport and thus increases safety at a construction site, and on the other hand enables high positioning accuracy of loads. Simultaneously, the georeferenced determination of the surroundings by the imaging sensor system enables monitoring of the construction site, which continuously provides data on incorrectly installed elements, for example, and also increases safety on the construction site.

In particular, the crane controller can adjust the movement of the crane or rotating tower crane in real time to achieve absolute position control of the suspended crane load. In particular, the crane can also be equipped with efficient sway damping in order to realize automated control of the desired position with the crane controller. The sway damping dampens the oscillation in the hoist rope that occurs when the crane moves automatically and makes absolute positioning difficult. In addition, the crane position itself can also be precisely sensed via georeferencing.

Simultaneous, fully automatic load transports with rotating tower cranes including sway damping are made possible without collisions, as the imaging measurement system can be used to sense the surroundings of the crane in real time, in particular also all persons and machines moving in the working area of the rotating tower crane. The surroundings and load position sensors sense both the crane's surroundings and also the absolute position of the hook or load and feed this back to the crane controller, which can then, for example, adapt an automatically planned path of the load hook of the automated crane to the surroundings.

The sensed surroundings model also contributes to the complete digitalization of construction sites. This means, on the one hand, that monitoring can be carried out for individual construction site processes and the overall status of the construction site by interpreting the surroundings model itself. On the other hand, object identification based on CAD data of the components can be used to create a sequential construction plan that can be automatically compared with building data (BIM).

The imaging sensor system is advantageously configured to provide a scatter plot characterizing the crane surroundings, which comprises a large number of ambient points, each of which is assigned height information, and forms a relief-type surroundings model. The geo-referencing device can assign geodata or absolute coordinates to the individual points of the scatter plot. The three-dimensional scatter plot is provided in real time during crane movements so that the 3D surroundings model obtained from it can also be supplied to the crane controller in real time and used for crane control tasks such as collision monitoring or evasive maneuvers.

The three-dimensional scatter plot forms a digital environmental relief composed of a large number of pixel-like relief points that can be identified by coordinates in a three-dimensional coordinate system and/or can each be provided with height information and position information in an elevation plane. The said scatter plot advantageously forms the total visible geometry of the crane surroundings.

In an advantageous further development of the invention, the imaging sensor system for providing the three-dimensional real-time surroundings data can have several cameras which can be mounted on the crane structure, preferably with a downward viewing direction, so that images of the crane surroundings can be recorded from a bird's eye view anchored to the crane structure.

Preferably, the multiple cameras take simultaneous overlapping images so that the images can be evaluated photogrammetrically based on the areas of overlap. In particular, the cameras can also record and provide said images with overlapping image sections during crane movements. In this respect, photogrammetric evaluation of the camera images can also be used to establish the initially unknown camera positions. Alternatively, or additionally, however, at least approximate values for the camera positions can also be established by integrating further sensor signals, e.g. a GNSS sensor on the jib and/or a position and/or deflection sensor for sensing the jib position, and a calibration.

An image evaluation device can have a computer, which can be provided on the crane or also in the crane surroundings, wherein said computer is advantageously configured to carry out photogrammetric processing of the recorded images. For example, the image evaluation device can include an object identification module in order to identify objects shown on the images, wherein, for example, a comparison can be made with building data from a building data model BIM, for example in order to sense or assign building contours. However, the image evaluation device is also preferably configured to establish objects 22 moving in the area surrounding the crane, such as workers or moving machines, and to make them available in real time as part of the surroundings model.

Advantageously, said image evaluation device further comprises a conversion module for converting the three-dimensional surroundings model established from the signals or data of the imaging sensor system to a format that can be processed by the crane controller. The converted surroundings model is then provided by the image evaluation device to the crane controller, which can then compare the surroundings model with the absolute position of the load hook or the load fastened to it in the said manner in order to control crane movements. For example, the surroundings model can be converted into a pixel-like elevation representation of the crane surroundings with height information for the individual elevation points, which can characterize the height difference between the individual elevation points and the crane jib, and coordinates for the elevation points, which characterize their position in an elevation plane perpendicular to the vertical and/or perpendicular to a crane jib axis. If the crane surroundings are viewed as a chessboard from the jib, the pixel-like elevation representation can form a three-dimensional chessboard whose squares protrude upwards to varying degrees.

The crane controller can, for example, include an oscillation damping device that can initiate oscillation damping countermeasures or provide control measures in real time based on the sensed absolute positions of the load hook or fastened load in order to dampen or prevent load sway. Alternatively, or additionally, the crane controller can also include a travel path determination module to plan or reschedule a travel path on the basis of the surroundings model if, for example, an obstacle such as a moving construction machine or another crane is detected in the real-time environment model. Alternatively, or additionally, the crane controller can also have an automatic movement control function to move a load fastened to the load handling means to the associated target position, which can be taken from a BIM model, for example, wherein the crane controller can establish the travel path to the target position using the real-time 3D surroundings model and then control the crane drives accordingly.

The geo-referencing device for geo-referencing the 3D environment data of the imaging sensor system can, for example, work with measured reference points that are distributed in a distributed manner on the construction site. The image evaluation device can sense said reference points in the captured camera images and use the sensed reference points to georeference the other image points or the other points of the three-dimensional scatter plot depicting the crane surroundings. If the load or load hook position is established as absolute in another way, the geo-referencing device can also use the known absolute position of the load handling means or the load as a reference point and use it to assign position coordinates to other image points or points of the three-dimensional scatter plot that depicts the crane surroundings.

Alternatively, or additionally, direct georeferencing can also be carried out. For example, the angular position of the jib on which the cameras are mounted can be established or sensed. The camera positions can be determined, at least as an approximation, by knowing the angle by which the jib was deflected at the time the image was taken and the predetermined distances of the cameras to the crane center/origin of the crane coordinate system and their orientation, which can be established by a calibration measurement. This enables direct georeferencing of the 3D data derived from the images.

The absolute position of the load hook or the load fastened to it can be established in various ways.

For example, the absolute position sensor system can comprise a GPS or GNSS sensor, which can be attached to the load handling means or to the load fastened to it and can establish the absolute position of the load handling means or the load fastened to it via satellite navigation, for example GPS signals, GLONASS signals or Galileo signals, and make it available to the crane controller. Preferably, such a GNSS sensor can have a wireless communication interface for wireless transmission of the position signals to the crane controller.

Alternatively, or in addition to one or more such GNSS sensors on the load handling means and/or on the load, the absolute position sensor system for establishing the absolute position of the load handling means and/or the load fastened to it can also have one or more tachymeters, which can be configured to operate optically and/or electronically. Here, a prism or signal reflector can be attached to the load handling means and/or the load fastened thereto, which has been previously determined by one or more tachymeters positioned in a distributed manner in the crane surroundings at a construction site, and its/their position(s) measured or tracked in order to establish the position of the load hook and/or the load with a high degree of specificity.

The at least one tachymeter provides the absolute position of the prism or the load hook or the load fastened to it in real time and transmits the position data to the crane controller, which can use the absolute position to establish deviations from a target position, for example, and control the crane drives on the basis of such deviations.

As an alternative or in addition to such tachymeter systems, the absolute position sensor system can also have an optical sensor system which has an imaging sensor system, in particular one or more cameras, which observe the load handling means and/or the load fastened to it and/or a marking attached to it. The marking detected by the image evaluation device or the detected load handling means and/or the detected load can then be geo-referenced by the geo-referencing device, wherein, for example, reference points measured on the construction site can be used in the manner already said, which appear in the images and relative to which the load hook position can then be established in absolute terms. Alternatively, or additionally, direct georeferencing can also be carried out in the manner mentioned above.

BRIEF DESCRIPTION OF THE DRAWINGS

The invention is explained in more detail below with reference to a preferred embodiment and associated drawings. The drawings show.

DETAILED DESCRIPTION

Figure 1:
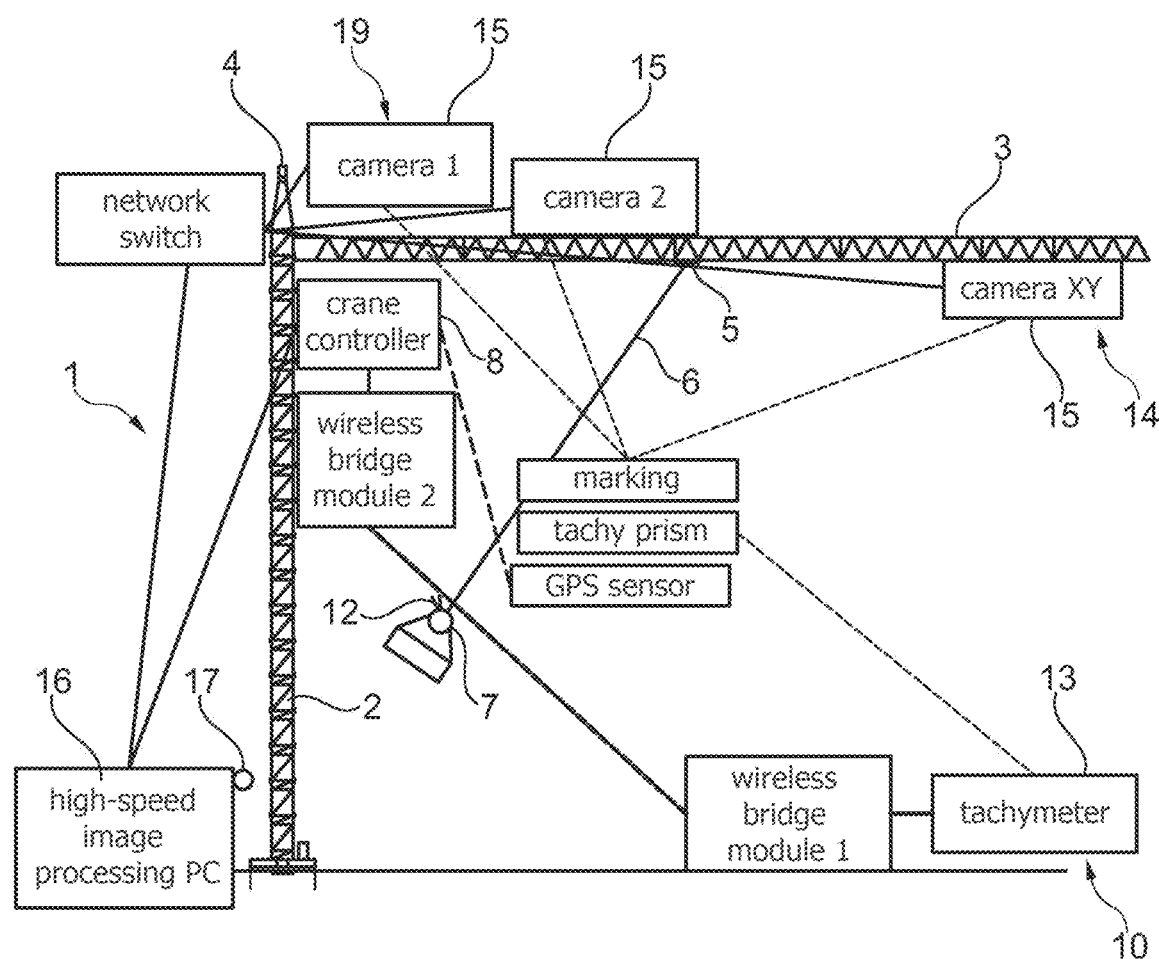
FIG. 1 a side view of a crane in the form of a rotating tower crane according to an advantageous embodiment of the invention, wherein on the crane structure there is provided a plurality of cameras for imaging sensing of the surroundings and a marking on the load handling means, furthermore a tachymeter for tachimetric establishing of the absolute position of the load hook and a GPS sensor on the load handling means for satellite-based absolute positioning of the load hook.

As FIG. 1 shows, the crane 1 can, for example, be configured to be an upright rotating tower crane, the crane structure of which has an upright extending tower 2, which carries a jib 3 and possibly a counter jib. Said jib 3 can be rotated relative to the tower 2 about the upright longitudinal axis 4 of the tower and assume an at least approximately horizontal position. Alternatively, it would also be possible for the tower 2 to be rotated together with the jib 3 relative to the crane base. It would also be possible for the jib 3 to be luffed up and down about a horizontal transverse axis.

A trolley 5 is movably suspended from said jib 3 so that the trolley 5 can be moved over essentially the total length of the jib 3 in order to vary the outreach of the load hook 7. Said load hook 7 is fastened to a hoist rope 6, which runs from the jib 3 via said trolley 5 in order to be able to lower and raise the load hook 7.

In order to be able to move the load hook 7 in the desired manner, the crane 1 comprises various crane drives, in particular a hoisting gear for retracting and lowering the hoist rope 6, a trolley drive for moving the trolley 5 and a slewing gear for rotating the jib 3 around the upright tower axis 4.

The said crane drives can be controlled by a crane controller 8, which can process control commands from an input device on a crane control stand or a remote control in a manner known per se, for example lift, turn and trolley travel commands. In addition, the crane controller 8 may have a travel control module to automatically establish and/or semi-automatically or fully automatically move a trolley for the load hook in order to move a received load from a receiving location to a destination.

Furthermore, the crane controller 8 comprises an oscillation damping device 9 to prevent, soften or dampen oscillating movements of the load hook 7 caused by various influences such as hasty input commands for the crane drives or wind forces. For example, said oscillation damping device 9 can override manual control commands that are entered too hastily and control the crane drives differently in order to have a sway damping effect.

The oscillation damping device 9 or the crane controller 8 can take into account the absolute position of the load hook 7 and its deviations from a target position.

A load position sensor system 10 can establish the absolute position of the load hook 7 or the load connected thereto in a superordinate coordinate system, wherein the absolute position sensor system 11 can comprise various sensor means.

As FIG. 1 shows, the load position sensor system 10 may have a GPS sensor 12 or another satellite-based GNNS sensor for satellite signal-based determination of the load hook position, wherein such a GPS or GNNS sensor may be fastened to the load hook 7 or may also be fastened to the load.

Preferably, said GPS sensor 12 may have a wireless communication interface which can communicate with a preferably also wireless communication interface of the crane controller 8 in order to transmit the respective position signal indicating the absolute position of the load hook 7 to the crane controller 8.

The crane controller 8 can compare the absolute position of the load hook 7, which is transmitted to the crane controller 8 in real time, with a respective target position, which can be obtained, for example, from a predetermined travel path for the load hook 7 or can be a target position, which can be obtained, for example, from a building data model. Based on the comparison of the absolute actual position with the predetermined target position, the crane controller 8 can then actuate the crane drives accordingly in order to move the load hook 7 exactly to the target position.

Alternatively, or additionally, the absolute load hook position, which is reported to the crane controller 8 in real time, can also be used by the oscillation damping device 9 to intervene to dampen the sway.

Alternatively, or in addition to such a GPS or GNSS sensor 12 on the load hook 7, the absolute position of the load hook 8 can also be determined using one or more tachymeters 13, which can be arranged in a distributed manner on the ground or the construction site in the surroundings of the crane 1 and establish the position of the load hook 7 or the load fastened thereto.

Said tachymeters can work electro-optically, optically or electronically. For example, a prism can be attached to the load hook 7, which reflects a light beam emitted by the tachymeter, wherein the tachymeters 13 sense the transit time and possibly also the phase shift of the reflected light beam and perform an angle measurement, and can establish the position of the load hook 7 from this.

Preferably, several tachymeters are arranged in a distributed manner on the floor in order to be able to track the load hook or the prism attached to it without any gaps.

The tachymeter or tachymeters provide the respective absolute position signal to the crane controller 8 in real time. As FIG. 1 shows, the tachymeters 13 can track the prism or reflector on the load hook and establish the absolute position of the load hook or the prism fastened to it from measurements of the signal paths and angles. This absolute position is suitably coded for data transmission to the crane controller 8 and transmitted by the coding device to the transmission interface of the crane controller 8.

As an alternative or in addition to such a tachimetric and/or satellite-based sensor system, the position of the load hook or the position of the load fastened to it can also be established optically using an imaging sensor system. In particular, such an imaging sensor system 14 may comprise one or more cameras 15, which may be mounted on the crane structure and in particular on the jib 3, in order to be able to sense a bird's eye view image of the crane surroundings and the load hook 7.

The respective images from one or more cameras 15 are evaluated by an image evaluation device 16, which may comprise a computer that may be provided on the crane 1 itself or in the crane surroundings. For example, the image data from the cameras 15 can be streamed to a network 17 to which said image evaluation device 16 is connected.

In order to simplify the identification of the load hook in the respective captured image, a special marking can be attached to the load hook, for example in the form of a triangle or a certain signal color and/or in particular also a coded target mark. In principle, however, it is also possible to identify the crane hook 7 based on its contour and size features in the camera or sensor image.

In order to obtain an absolute position of the load hook 7 from the image data, the imaging sensor system 14 can also sense reference points calibrated by the tachymeter, for example, or the image evaluation device 16 can identify such reference points in the sensor images. Advantageously, at least 3 or more such measured reference points can be attached over the construction site or on the ground or the existing building structure, the absolute position of which is known.

Figure 2:
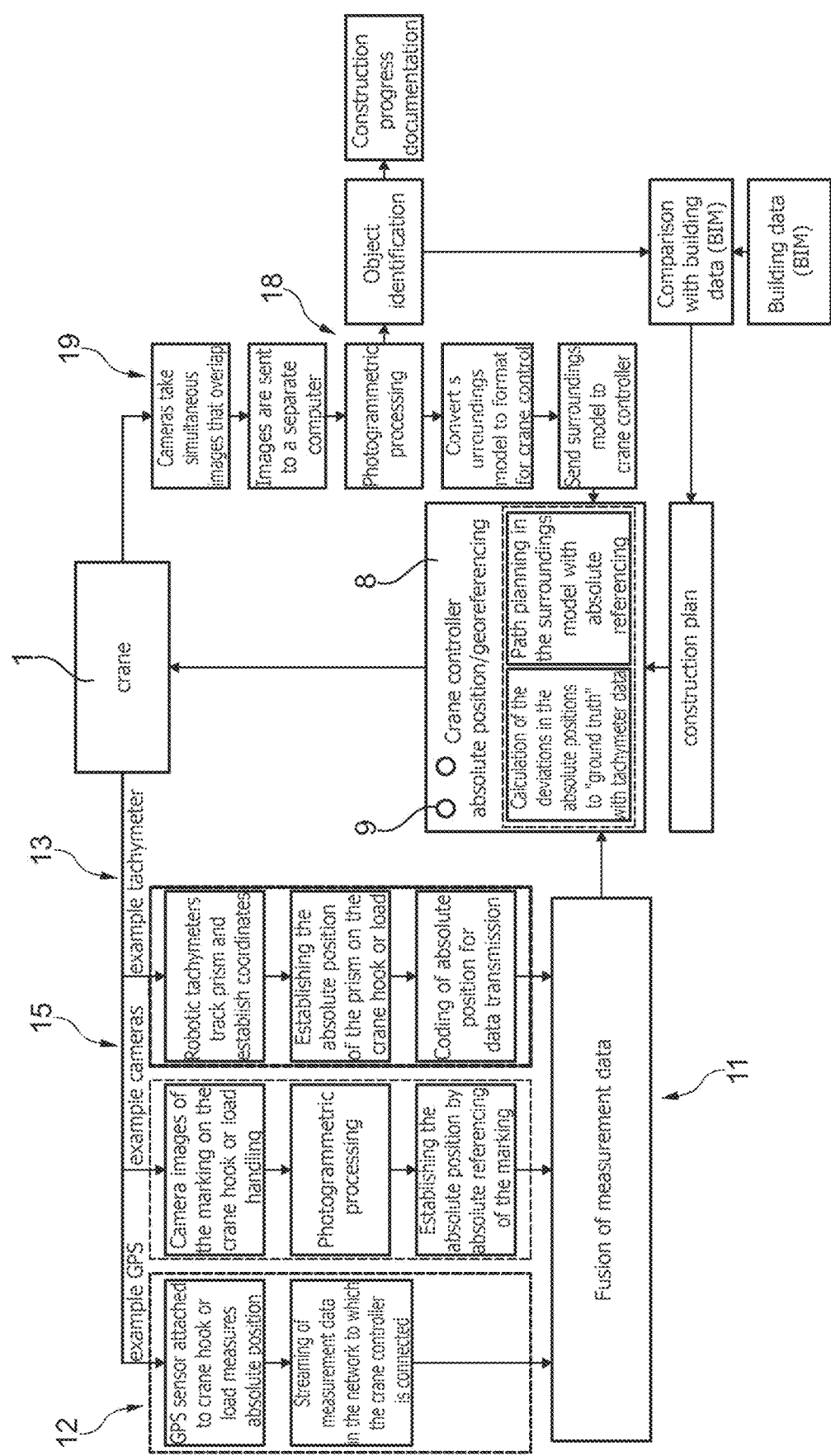
FIG. 2 a flow chart to illustrate the merging of the real-time absolute position of the load handling means and the real-time 3D surroundings model at the crane controller, which controls the crane drives on the basis of the absolute position of the load handling means and the 3D surroundings model.

A geo-referencing device 18 can determine the absolute position of the load hook in the superordinate coordinate system from the reference points identified in the images and the identified load hook marking and transmit the absolute load hook position established by geo-referencing to the interface of the crane controller 8, see FIG. 2.

The said cameras 15 mounted on the crane structure, in particular the jib 3, and/or other cameras which may be mounted in the crane surroundings to provide bird's eye view images of the crane surroundings, may simultaneously also be part of a surroundings sensor system 19 by means of which surroundings data can be sensed which can characterize the topography and/or building structure in the crane surroundings and, in particular, also the total geometry of the scene or surroundings including moving objects such as persons or machines. In particular, 3D surroundings data can be provided in real time, from which said image evaluation device 16 can establish a 3D surroundings model in real time and transmit it to the crane controller 8.

Figure 3:
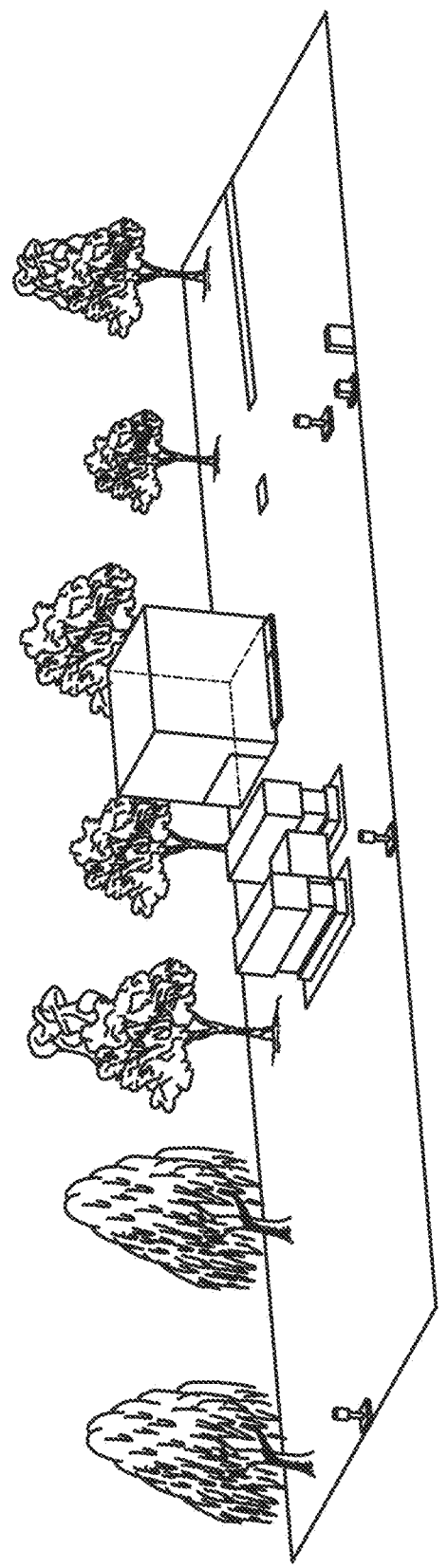
FIG. 3 a perspective representation of the 3D surroundings model sensed by the imaging sensor system in the form of a point cloud.

Said cameras 15 can monitor overlapping image sections or provide overlapping images, which can then be evaluated by the image evaluation device 16 with regard to the image points or the points of the scatter plot, which, for example, form building contours, people on the construction site or construction machinery in the sensor-monitored surroundings, see FIG. 3.

The already mentioned geo-referencing device 18 can assign coordinates in the superordinate coordinate system to the points of the sensed scatter plot or assign absolute position data for them.

The geo-referencing device 18 can, for example, work with the already said measured reference points, which can be arranged in a distributed manner in the crane surroundings. Alternatively, or additionally, the geo-referencing device can also work with the absolute position signal, for example, which indicates the position of the load hook 7 and can come, for example, from the GPS sensor 12 or the tachymeters 13, in order to be able to provide the 3D points identified in the camera images with coordinates.

As FIG. 2 shows, the measurement data from the absolute position sensor system 11 can be compared or merged with each other in order to provide a reliable, absolute position signal for the load hook 7 and geo-referenced surroundings data to the crane controller 8.

In particular, the following procedure can be useful, as shown in FIG. 2:

The absolute position of the hook 7 or the load is measured using the steps on the left-hand side. For this purpose, sensors are used to establish the kinematic absolute position and the measured absolute position is supplied to the crane controller in real time.

For the tachymeter 13 example, the tachymeter 13 or a plurality of tachymeters 13 installed at a construction site is set to track the prism on the hook 7. The absolute position of the moving object (crane hook, load) is then tracked via the tachymeter 13 and the position sensed with a high frequency value. The measurement data is then encoded as a CAN message at each time step and fed back to the crane controller 8 via a wireless connection. The deviation in the absolute position from the position sensed by the relative sensors of the crane is then calculated in the crane controller and the setpoint of the crane controller is adjusted so that the position error of the hook or load is compensated.

For the cameras 15 example, images of the cameras 15 on the jib 3 are formed in the same way as for the generation of the surroundings model. These images are sent to the image processing computer 12. During image processing, the position of the marking that was previously attached to the crane hook 7 or the load is referenced with absolute coordinates. The calculated absolute position can then be sent to the crane controller 8 via the same or a different network that also transmits the surroundings model to the crane controller 8.

For the example GNSS sensor 12, this is set up so that the GNSS sensor streams its measured absolute position into a network to which the crane controller is also connected. As the GNSS sensor 12 is attached to the crane hook 7 or the load, the absolute position of the crane hook 7 or the load is also measured.

Figure 4:
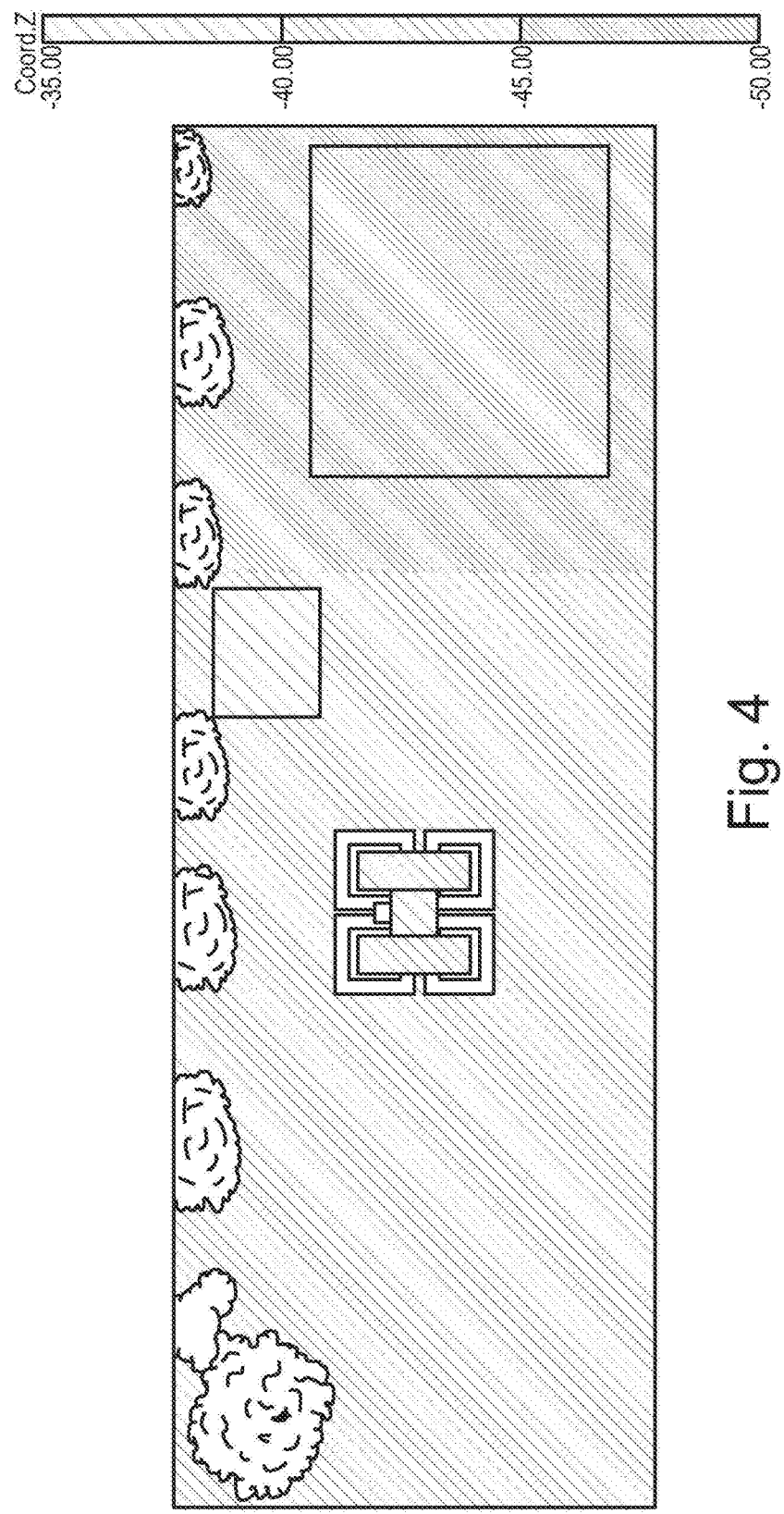
FIG. 4 a representation of the point cloud from FIG. 3 depicting the crane surroundings, which has been transformed into an elevation representation in which different gray levels represent different elevations of the individual points.
Figure 5:
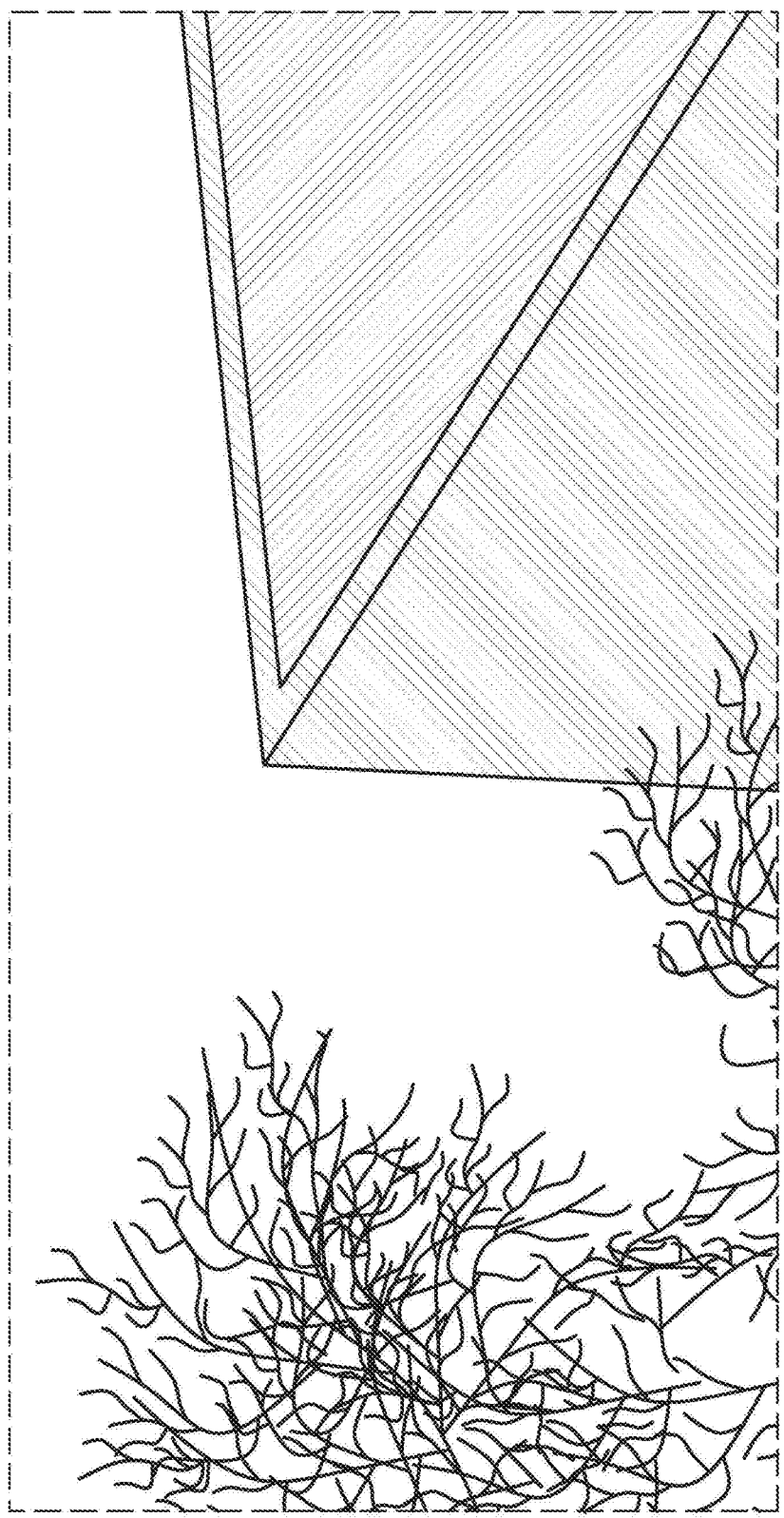
FIG. 5 a sectional, enlarged view of the perspective point model from FIG. 3, showing the individual points of the point model.

The procedure for generating the surroundings model and feeding it back to the crane controller is shown on the right-hand side of FIG. 2. For the surroundings model, images are first formed simultaneously with the cameras 15 attached to the jib 3. During the movement of the crane 1, this creates an overlapping image formation both along the jib 3 and also in the direction of rotation of the jib. The images are then sent to a computer of an image evaluation device 16, which can perform photogrammetric processing in real time using suitable algorithms such as visual SLAM. The surroundings model is then converted so that it can be processed by the crane controller 8, see FIGS. 3 and 4 in comparison. The model is then transferred, for example via the Ethernet. This means that the crane controller 8 has received the current surroundings model and can control the crane 1 or its crane drives in real time to ensure collision-free load transport.

The photogrammetric processing of the images preferably also comprises object identification with subsequent semantic modeling and thus enables both the automatic establishing of the start and destination coordinates of a transport process and the monitoring of construction progress at a construction site. Using construction data (BIM), it is first possible to determine when which component needs to be installed and to plan a sequence of transportation processes that corresponds to the construction schedule. The next component to be transported is then detected using its known CAD data in the images or the 3D data of the surroundings model and its position is determined. Simultaneously, the detection of known building elements and the establishing of their position can be used for construction progress control by comparing them with the planning data.

We claim:

1. A rotating tower crane comprising:
   a crane jib from which a hoist rope connected to a load handler runs,
   a load position sensor system for sensing the position of the load handler and/or a load fastened thereto,
   a surroundings sensor system for collecting surroundings data to establish a surroundings model, and
   a crane controller for controlling crane drives for hoist rope and/or crane movements on the basis of the sensed position of the load handler and/or the load fastened thereto and on the basis of the established surroundings model, wherein the surroundings sensor system has an imaging sensor system for providing three-dimensional real-time surroundings data and a geo-referencing device for geo-referencing the three-dimensional real-time surroundings data and establishing a geo-referenced 3D surroundings model, wherein the load position sensor system has an absolute position sensor system for sensing the absolute position of the load handler and/or the load fastened thereto and the crane controller is configured to control the crane drives on the basis of a comparison of the absolute position of the load handler and/or the load fastened thereto with the geo-referenced 3D surroundings model.

2. The crane of claim 1, wherein the crane controller has an oscillation damping device which, on the basis of the absolute position, supplied in real time, of the load handler and/or on the basis of the load fastened thereto and, using the geo-referenced 3D surroundings model supplied in real time to control the crane drives for damping oscillating movements, wherein the oscillation damping device is configured to compare the transmitted absolute position with a predetermined target position and to control the crane drives using the comparison.

3. The crane of claim 1, wherein the crane controller has a movement control for the automated movement of the load handler along a predetermined movement path, wherein a movement device automatically controls the crane drives on the basis of the absolute position of the load handler and/or on the basis of the load supplied in real time and on the geo-referenced 3D model supplied in real time.

4. The crane of claim 3, wherein the crane controller comprises a travel path establishing device for the automated establishing of the travel path for the load handler on the basis of the geo-referenced 3D surroundings model supplied in real time taking account of building information from a BIM model.

5. The crane of claim 1, wherein the imaging sensor system is configured to provide a scatter plot characterizing the crane surroundings, wherein the scatter plot comprises a plurality of ambient points each having a height information, wherein each of the ambient points height informations is assigned and forms a relief-type surroundings model, and wherein the geo-referencing device is configured to assign absolute coordinates to the ambient points of the scatter plot.

6. The crane of claim 1, wherein the imaging sensor system comprises a plurality of cameras mounted on the crane jib and configured to provide bird's eye perspective images of the crane environment.

7. The crane of claim 6, wherein the images provided by the cameras overlap.

8. The crane of claim 6, further comprising a photogrammetric image evaluation device for a photogrammetric evaluation of the camera images and establishing the 3D surroundings model from the camera images.

9. The crane of claim 6, wherein the cameras are configured to provide simultaneous overlapping images of the crane surroundings during crane movements, wherein the image evaluation device is configured to evaluate the images of the cameras in real time and to establish a relief-like surrounding image characterizing the crane surroundings in the form of a three-dimensional scatter plot, wherein the establishing of the relief-like surrounding image uses the camera images in real-time and provided by the geo-referencing device which assigns surrounding image points in the images to position data in the superordinate coordinate system.

10. The crane of claim 1, wherein the imaging sensor system comprises one or more laser scanners mounted on the crane jib of the crane structure of the crane, wherein the one or more laser scanners are configured to provide bird's eye view scanning images of the crane surroundings in real time during crane movements, from which the 3D surroundings model can be determined in real time.

11. The crane of claim 1, wherein the image evaluation device is configured to identify measured reference points which are arranged in a distributed manner in the crane surroundings, wherein the geo-referencing device is configured to assign geodata to other objects identified in the sensor images on the basis of the identified, measured reference points.

12. The crane of claim 1, wherein the surroundings sensor system has a formatting module for converting the format of the georeferenced three-dimensional surroundings model for the crane controller.

13. The crane of claim 12, wherein the formatting module is configured to convert the surroundings model into a pixel-like elevation representation of the crane surroundings with height information for the individual elevation points which characterize the height difference between the individual elevation points and the crane jib, and coordinates for the elevation points which characterize their position in an elevation plane perpendicular to the vertical and/or perpendicular to a crane jib axis.

14. The crane of claim 1, wherein the imaging sensor system has a communication interface for streaming the sensor images into a network to which the image evaluation device is connected.

15. The crane of claim 1, wherein the image evaluation device is configured to identify the position of the load handler and/or a load fastened thereto in the sensor images, wherein the geo-referencing device is configured to assign absolute position data to the load handler identified in the sensor images and/or the load fastened thereto.

16. The crane of claim 1, wherein the geo-referencing device is configured to use a sensor-sensed absolute position of the load handler and/or the load fastened thereto to assign absolute position data by geo-referencing to other image points lying in the sensor images next to the load handler, wherein the other image points comprise points of a three-dimensional scatter plot characterizing the crane surroundings.

17. The crane of claim 1, wherein the load position sensor system has a satellite signal-based sensor comprising a GPS or GNNS sensor for establishing the absolute position of the load handler and/or the load fastened thereto, wherein the satellite-based sensor is attached to the load handler and/or the load fastened thereto.

18. The crane of claim 17, wherein the satellite-based sensor has a wireless communication interface for transmitting the absolute position to a wireless communication interface of the crane controller.

19. The crane of claim 1, wherein the load position sensor system has one or more tachymeters for tachymetrically establishing the absolute position of the load handler and/or the load fastened thereto.

20. The crane of claim 19, further comprising a plurality of tachymeters distributed in the crane surroundings, and a reflector comprising a prism on the load handler and/or the load fastened thereto for signaling the object to be measured and/or for reflecting the tachymetric signals.

21. A method for controlling a crane from the crane jib of which a hoist rope connected to a load handler runs, wherein the position of the load handler and/or a load fastened thereto is sensed by a load position sensor system and the surroundings data for establishing a surroundings model is sensed by a surroundings sensor system, and wherein crane drives for hoist rope and/or crane movements are controlled by a crane controller on the basis of the sensed position of the load handler and/or the load fastened thereto and the established surroundings model, wherein the three-dimensional real-time surroundings data is geo-referenced by the surroundings sensor system by an imaging sensor system and the three-dimensional real-time surroundings data is geo-referenced by a geo-referencing device and a geo-referenced 3D surroundings model is established, wherein the crane drives are controlled by the crane controller on the basis of a comparison of the absolute position of the load handler and/or the load fastened thereto with the geo-referenced 3D surroundings model.

22. An apparatus for controlling a crane, from the crane jib of which a hoist rope connected to a load handler runs, comprising a load position sensor system for sensing the position of the load handler and/or a load fastened thereto, a surroundings sensor system for collecting surroundings data to establish a surroundings model, and a crane controller for controlling crane drives for hoist rope and/or crane movements on the basis of the sensed position of the load handler and/or the load fastened thereto and on the basis of the established surroundings model, wherein the surroundings sensor system has an imaging sensor system for providing three-dimensional real-time surroundings data and a geo-referencing device for geo-referencing the three-dimensional real-time surroundings data and establishing a geo-referenced 3D surroundings model, wherein the load position sensor system has an absolute position sensor system for sensing the absolute position of the load handler and/or the load fastened thereto and the crane controller is configured to control the crane drives on the basis of a comparison of the absolute position of the load handler and/or the load fastened thereto with the geo-referenced 3D surroundings model.

\* \* \* \* \*